Jan. 4, 1966   J. J. SWIFT   3,227,472
METER READING CARD CONTAINER
Filed July 19, 1963   2 Sheets-Sheet 1
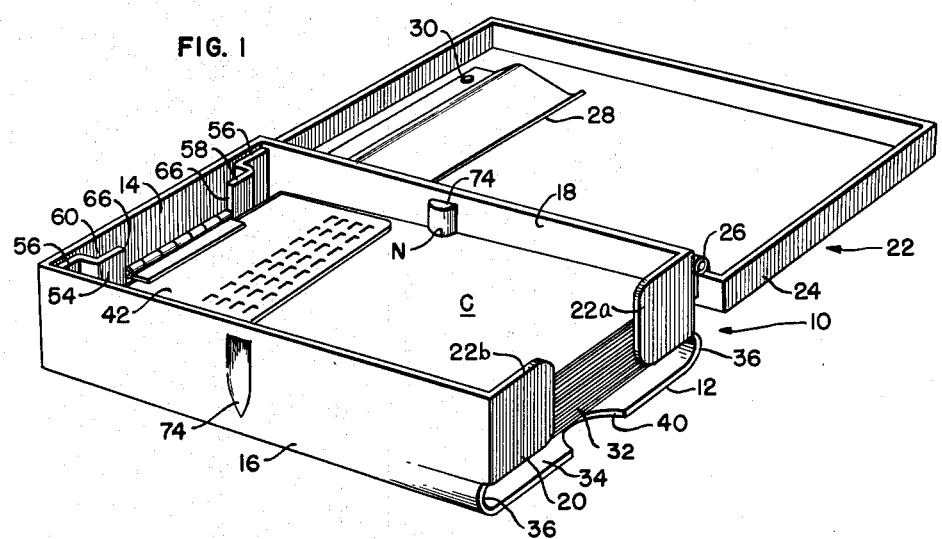
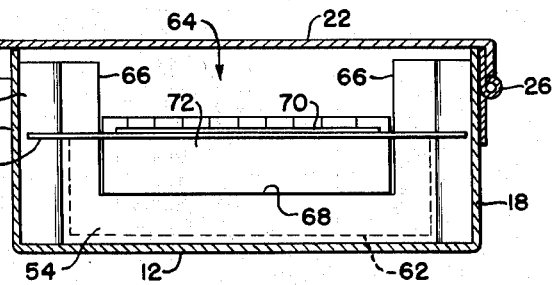
INVENTOR
JAMES J. SWIFT
BY
ATTORNEYS Jan. 4, 1966   J. J. SWIFT   3,227,472
METER READING CARD CONTAINER
Filed July 19, 1963   2 Sheets-Sheet 2
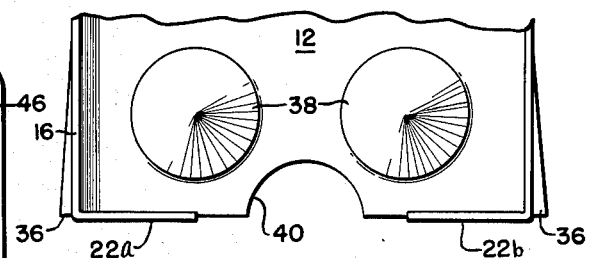
FIG. 5
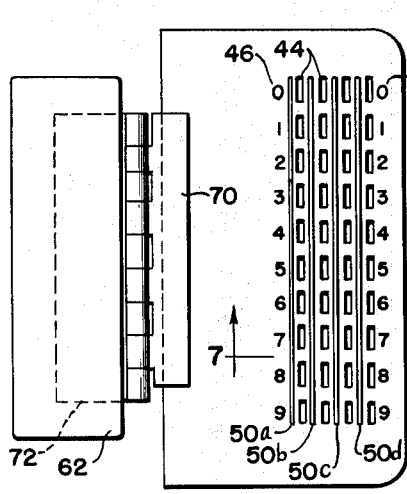
FIG. 6
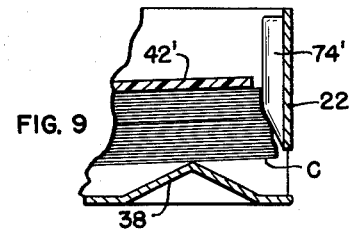
FIG. 9
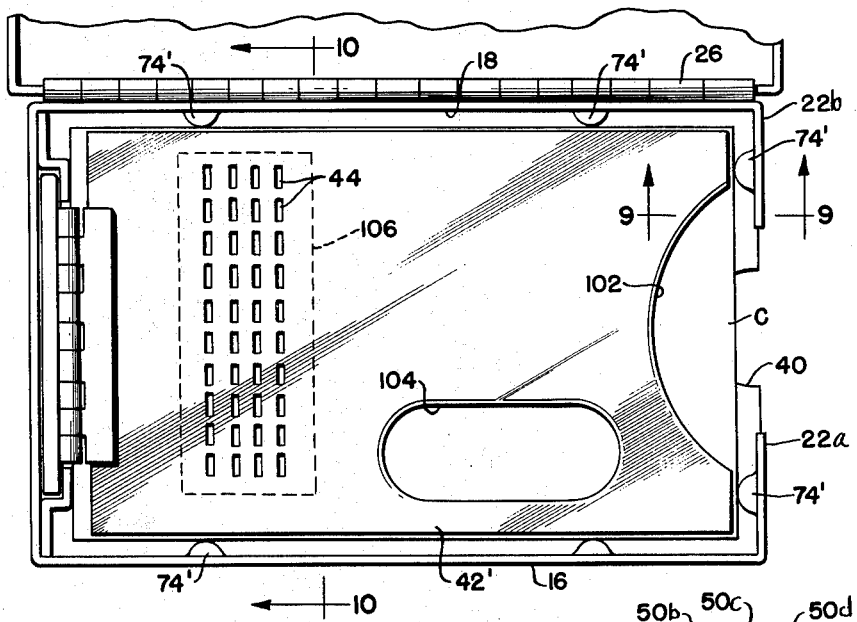
FIG. 8
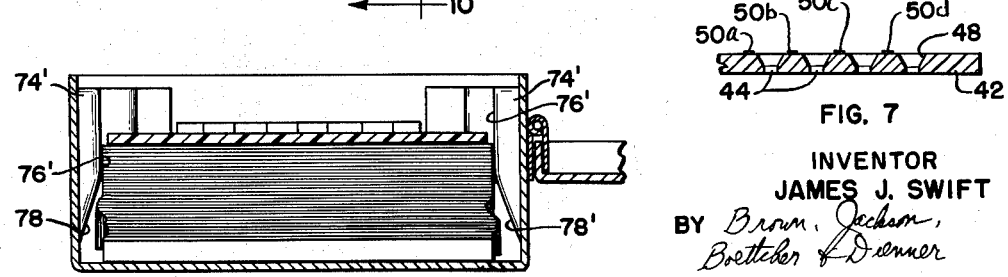
FIG. 10
FIG. 7
INVENTOR
JAMES J. SWIFT
BY Brown, Jackson,
Boettcher & Dienner
ATTORNEYS 3,227,472
METER READING CARD CONTAINER
James J. Swift, 204 S. Maple Ave., Oak Park, Ill.
Filed July 19, 1963, Ser No. 296,334
10 Claims. (Cl. 281—44)

This invention relates to meter reading card containers and more particularly to such containers which are adapted to facilitate accurate recordings of a meter reading.

Although not limited thereto, the invention has importance to private or public utilities such as the various gas, electric power and water companies who make a charge for their service on the basis of the number of units of the gas, electricity or water used by its customers. Conventionally, the meter reader of such companies is provided with a stack of rectangular cards, one for each customer, on which the reader is instructed to make a record of the customer's meter reading. For this purpose, these cards are commonly provided with a plurality of columns of marking areas, the columns corresponding to units, tens, hundreds, thousands, etc. of the quantities of gas, electricity or water which the meter records, each column comprising ten marking areas corresponding to 0 through 9. By marking only the areas of each column which correspond to the meter reading, the cards may be then fed through the electronic computing or tabulating machines now commonly used by large companies to facilitate their bookkeeping and billing operations. However, in order for the machine to correctly interpret the information as recorded by the meter reader on the customer's card, the marks must be accurately located in the designated marking areas. This requires a certain degree of skill as well as attention to be sure that the designated areas are not only fully filled in by the marking pencil so as to produce a readily sensible mark but so that the marking is not to one side of the area where it will be either missed or incorrectly interpreted by the machine in its scanning of the meter reading card.

Therefore, a broad general object of my invention is to provide means for assuring accurate and convenient placement of markings upon predesignated areas of meter reading cards in order to improve the efficiency of the mark sensing or scanning by the automatic data processing machines such as are now used by the various utilities companies in their billing operation.

Another object of the invention is to eliminate errors which in the past have resulted from failure of the meter reader to place the markings in the coded marking areas which are essential to accurate interpretation of the meter reading by the data processing machines.

A further object of the invention is to increase the speed and decrease the skill and effort with which the sensitizing marks may be applied to the meter reading cards by the meter reader.

In the accomplishment of these and other objects, I provide a container of rectangular shape and dimensions in which to store a stack of cards having the mentioned coded marking areas thereon, one for each customer, and preferably in the order in which he intends to read the meters on his reading route, the first customer's card being at the top of the stack, the next customer's card being immediately below it, etc. Over the top of the stack of cards, I place a template having stencil openings therethrough corresponding to the coded marking areas on the cards. The template, I key to one wall of the container by means of a weighted slide which slidingly interfits with an appropriately shaped vertical keyway. The template, in the preferred form, is hingedly connected thereto about a horizontally disposed axis. The template is therefore free to bear flat against the top card under the action of the weighted slide but cannot twist and is accurately located. To assure proper register of the top card and its coded marking areas with the stencil openings in the template, means in the form of vertical projections are provided which appropriately center and hold the top card in a predetermined stable and fixed location. In one form of the invention, the cards have a marginal cutout in their two opposite sides and the vertical projections are located and dimenisoned to be received in said cutouts. In another form, the container is slightly larger than the dimensions of the cards and pairs of the mentioned vertically extending projections are provided along the inner surface of the other three walls which center the cards laterally while forcing the one edge thereof against the fourth wall which may be that to which the template is detachably keyed.

For maximum utility, the wall of the container opposite that to which the template is keyed is provided with an inverted T-shaped slot, the vertical portion of which interrupts the top edge of said wall and the lateral of which T-slot is disposed adjacent the bottom wall of the container and essentially the full width thereof. The lateral portion of the T-slot permits each card as it comes to the top of the stack and is marked, to be removed and placed at the bottom of the stack. To facilitate insertion of the marked cards at the bottom of the stack, spacer means may be provided on the bottom wall adjacent to, but spaced from, said wall containing the horizontal slot. This has the advantage that the height of the stack remains essentially constant, and is reduced only by cards of those customers which are missed and when removed from the top of the stack are conveniently set aside as beneath a spring clip provided for this purpose in the cover to the card case.

In order to accommodate the insertion of the cards at the bottom of the stack as they are marked and removed from the top, the vertically extending projections along the sidewalls which align the top card beneath the template have this lower section tapered downwardly and merging into the inner surface of said walls above the bottom wall of the container. This taper effectively aligns the cards of the stack as they rise toward the top.

The hinged connection of the template about a horizontal pivot further facilitates removal of the top card from the stack after it has been marked.

Thus a specific object and/or feature of the invention is the provision of an improved meter reading card case having an affixed template by which it is adapted both for storage and convenience in accurately marking each customer's card as his meter is read.

Another feature of the invention is that not only do the stencil openings in the template afford accurate control over and facilitate completely marking the areas of the card beneath but also the openings are precisely registered with the coded marking areas of the card underneath.

Another feature of the invention is that the template may be opaque or transparent and may cover the entire card or only the portion thereof containing the coded marking areas. When covering the entire card, it is usefully provided with a cutout area which allows for making notes on the customer's card.

In one form of the invention, the stencil openings are provided with beveled walls which feature facilitates convenient marking of the exposed coded area of the card beneath whether the pencil is held directly perpendicular to the card and/or template or at some angle thereto.

Another feature of the invention is that the area of the template about the stencil openings is dulled, and where the template is of transparent plastic will be frosted to reduce glare from the flashlight which is used when marking the cards in a darkened area.

Another feature of the invention is that not only is each line of the columns identified by a marginally located numeral but also the several columns are separated by dividing lines of different colors which the reader soon learns through his experience to differentiate between the columns. Both these features help to minimize mismarking of the cards. This provides for accurate and interpretable marking of the cards. It also facilitates neatness as well as rapidity in marking the cards as compared with free hand marking.

Many other objects, advantages and/or features of the invention will be at once or will become apparent from the description of preferred embodiments of the invention which now will be described. It will be understood, however, that said description is not to be taken in a limiting sense, since many modifications, changes and/or rearrangement of parts will suggest themselves or be suggested from a reading of said description and are to be included within the scope of the invention, the limits of which are defined by the appended claims.

Now referring to the drawings wherein like parts in the several views are indicated by like reference numerals:

FIGURE 1 illustrates a preferred embodiment of the invention wherein the container is illustrated in prespective view with the cover open;

FIGURE 2 is a vertical section taken through the container of FIGURE 1, the cover being shown in closed position;

FIGURE 3 is a cross sectional vertical view taken along lines 3—3 of FIGURE 2, looking in the direction indicated by the arrows;

FIGURE 4 is a fragmented sectional view taken along lines 4—4 of FIGURE 2;

FIGURE 5 is a horizontal sectional view taken along lines 5—5 of FIGURE 2 looking in the direction indicated by the arrows;

FIGURE 6 is a view of the template and slide to which it is hingedly connected, the same being shown detached from its keyway in the storage container for the meter reading cards;

FIGURE 7 is a sectional view taken through the template along lines 7—7 of FIGURE 6 and illustrates the beveled side edges of its stencil openings;

FIGURE 8 is a fragmented top plan view of an alternate structure, the cover being shown in open position and fragmented;

FIGURE 9 is a sectional view taken along lines 9—9 of FIGURE 8 to illustrate details of the card locating means provided on the forward tabs of the container; and FIGURE 10 is a sectional view taken along lines 10—10 of FIGURE 8 to illustrate details of the locating means provided on the two sidewalls of the container.

Referring now more specifically, to FIGURES 1 through 6 and first to FIGURES 1 and 2, a first embodiment of the invention is there illustrated as comprising a container or case generally designated as 10 and containing a stack of meter reading cards C.

Cards C are conventional machine tabulating cards all the same size and rectangular shape. To tabulate data thereon, the user makes appropriate markings thereon which are scanned by the machine, the location of the markings identifying a specific value or values of the recorded information. For purposes of recording a meter reading thereon, each card has a selected area thereof divided into a number of delineated areas, aligned in vertical columns and horizontal rows. The rows are customarily numbered 0, 1, 2, 3, 4, 5, 6, 7, 8 and 9 or otherwise as are the meter dials being read, the columns corresponding in number and position to the reading dials, for example, starting from the right hand side, the first column may be considered to designate units of the gas, electricity, water, etc. being measured by the meter, the next column, tens of said units, the next column hundreds of said units, and so on. Ordinarily, the reader will be supplied one card for each of the customers on his route and will be arranged in the stack in the order they are to be read. The cards therefore will also bear the customer's name, address and perhaps his identifying number as well as other necessary information.

Case 10 may be stamped, pressed or otherwise constructed out of a light weight sheet material such as aluminum, plastic or other suitable material and comprises a bottom wall 12 having integrally formed therewith an upstanding rear wall 14, a pair of sidewalls 16, 18 and a forward wall designated generically at 20, said walls being at right angles to adjoining walls and dimensioned to define a generally rectangular shaped interior area corresponding approximately to the rectangular shape and dimensions of the cards C. Conveniently the height of said walls 14–20 will be greater than the height to which the cards C are to be stacked thereon, and the open top of the container 10 through which it is normally loaded, is closed by a cover designated generally at 22. Appropriately, said cover has a depending flange 24 around its periphery which overlaps the top edges of said sidewalls 14–20 of the container 10 to provide a weatherproof top therefor. Said cover 22 is preferably hinged to the container along the top edge of one of its four walls. In FIGURE 1 cover 22 is illustrated as hinged to wall 18 by element 26, although if desired, it could as well have been hinged to end wall 14 or its other sidewall 16, and less conveniently to forward wall 20. A spring clip 28 is shown riveted at 30 to the inside surface of the top of the cover 22 adjacent one end to releasably support cards separate from stack C. For example, it may bs used to hold cards of customars who were found not at home and whose meters therefore must be read on a second trip or otherwise specially treated.

Referring now to FIGURE 1, the front wall 20 of the container is illustrated as comprising a pair of tabs 22a, 22b projecting at right angles from the ends of sidewalls 16, 18 inwardly toward each other leaving a vertical space 32 therebetween. The top edge of said tabs 22a, 22b is illustrated approximately level with the top edges of sidewalls 14, 16 and 18. Their lower edges however are spaced from the container bottom wall 12 to provide a horizontal slot 34 which extends across the width of the end wall 20 and at the ends of said slots portions of sidewalls 16, 18 are shown flared outwardly at 36 to effectively increase the width of said slot 34. Slot 34 provides means which permit the reader to replace the top card of the stack at the bottom of the stack of cards without having to remove the entire stack. Insertion of the card through said slot 34 at the bottom of the stack is further facilitated by providing the bottom wall with spacer means, for example, the illustrated upstanding bosses 38 (FIGURES 2 and 5) which are located at the forward end of the bottom wall 12 but spaced from said horizontal slot 34. The forward end of the card stack is therefore actually spaced off the bottom wall at least adjacent slot 34. Flared portions 36 at the ends of said slot merge into the sidewalls 16, 18 so that their converging shape (FIGURE 5) serves to guide the inserted card into alignment beneath the remaining cards of the stack. Space 32 between tabs 22a and 22b is actually a vertical extension of horizontal slot 34 and forms therewith what may be described as an inverted T-slot. Space 32 or the vertical extension of said inverted T-slot is purposely wide enough to provide finger clearance for the reader when grasping the end of a stack of cards C to either position the stack or to remove it from the interior of the container 10. Such handling of the stack of cards is also facilitated by means of the semicircular cutout 40 shown on the forward edge of the bottom wall 12.

An important feature of the invention is the novel arrangement of a template and cooperating means which facilitates accurate marking of the customer's card as his meter is read. Referring therefore to FIGURE 1 and 6, a template of dull finished metal or plastic is illustrated at 42 dimensioned to cover at least the portion of the cards C having the afore-described coded areas which are to be marked by the meter reader to correspond with the reading he takes of the customer's meter. Template 42 may also be dimensioned to correspond in width and length to the dimensions of the cards C and may be either transparent, translucent or opaque. Referring to FIGURE 6, template 42 is seen to comprise oblong shaped stencil openings 44 arranged in ten horizontal rows and four vertical columns. It will be understood, however, that the shape of said stencil openings 44 as well as the number of horizontal rows and vertical columns thereof may vary from the illustration in accordance with the invention since they are intended to correspond to the shape, location and arrangement of the coded marking areas of the customer cards C. Where four columns of stencil openings 44 are utilized as illustrated, the left hand column may be considered to represent thousands, the next column hundreds, the next column tens and the right hand column units of the quantity of either gas, electricity or water the meter being read measures. Commonly, each column will correspond to a dial on the meter and the stencil openings correspond to the numbers on the respective dials. Thus reading from top to bottom, the stencil openings correspond to values 0, 1, 2, 3, 4, 5, 6, 7, 8 and 9. I will be understood that the reader will mark the card through one opening 44 in each column which corresponds to the value designated by the particular dial of the meter. To minimize errors in identifying the values represented by the stencil openings 44, the horizontal rows are identified by the vertical columns 46 of reference numerals along the right and left hand sides of the columns of stencil openings. The individual vertical columns of openings 44 are also separated by colored lines indicated at 50a–50d which are preferably of different colors. For example, I have found it useful in practice to make boundary line 50a red, line 50b blue, line 50c yellow and line 50d green, although any other color system may be used. Through his experience with the template the reader soon associates each dial reading as defined between a particular pair of color boundary lines and since the horizontal rows are identified by reference numerals at both ends, errors in marking are reduced to a minimum. As previously mentioned, slots 44 are shaped to exactly correspond to the marking areas on the cards C and so that if accurately aligned therewith the template provides means which encourage complete and heavy as well as accurate marking of the cards so as to minimize scanning difficulties when the cards are fed through the tabulating or billing machines. Bevelling the sides of the slots 44 as illustrated at 48 in FIGURE 7 accommodates marking the coded areas of the cards at almost any angle at which the reader chances to hold the marking pencil. This is important where the template is formed of relatively thick material, although it is less important where the template is sufficiently thin.

In accordance with the invention template 42 is free to move vertically in order to adjust to different and changing heights of the cards as stacked in the container 10. At the same time its position considered in a horizontal plane and relative to the four walls of the container 10 remains fixed and unchanging. Conveniently, however, it is detachable from the container and also pivotable about a horizontal axis which accommodates removal of the top card in the stack after it has been marked and so as to be inserted at the bottom of the stack through slot 34. Means are therefore provided for hinging the template 42 to a member which slides in a vertical keyway provided one wall of the container, which in FIGURE 1 is rear wall 14. Referring next to FIGURES 1, 2 and 3, a piece of sheet metal 54 is shown having the margins 56 of its two side edges welded or otherwise secured to the inner surface of wall 14 adjacent the two rear corners of the container. The central portion 58 of said sheet member 54 has been struck outwardly so that it is planar in shape and spaced in offset parallel relation with rear wall 14. Space 60 between said offset portion 58 and wall 14 thus defines a guideway in which slidingly fits a weighted plate 62 whose dimensions correspond essentially to the width and length of said space, and having a height perhaps one-half the height of wall 14. The upper edge of the offset portion 58 of sheet member 54 is cut out at 64 so as to provide a pair of vertically parallel edges 66 spaced apart a distance less than the corresponding dimension of the space 60 and so as to have a lower edge 68 spaced above the container bottom wall 12. Template 42 is hingedly connected to the slide 62 by a hinge element comprising hingedly connected plates 70 and 72. Hinge plate 70 is shown secured in overlapping relation with the rear edge of the template 42 and hinge plate 72 is shown secured in overlapping relation with the top half of weighted slide 62. Plate 72 is shown in FIGURE 3 as rectangular in shape and so arranged on slide 62 and dimensioned that its vertical edges engage vertical edges 66 of cutout 64. Template 42 is therefore free to move vertically in response to the weight of slide 62 so that it can adjust to different height of the cards and bear flat against the top card of the stack, and is also restrained against lateral displacement. As thus keyed to wall 14, template 42 provides a reference with which the stack of cards C may be centered so that each card C as it reaches the top of the stack will have its coded marking areas exactly aligned beneath the corresponding stencil openings 44 of the template. For this purpose cards C are especially designed with accurately located notch N in its opposed two side edges and which in the illustrated example (FIGURE 1) is semi-cylindrical in shape. Aligning means to engage in said notches N are appropriately located at 74 on the two sidewalls 16, 18 of the container 10. These portions 74 may be vertically extending projections struck inwardly from the material of said sidewalls or separately formed and attached thereto as with screws or by welding. Each said projections 74 includes an upper semi-cylindrical portion 76 or otherwise having a shape exactly corresponding to the shape of notches N in the cards. Said semi-cylindrical portions terminate just below the top edge of the container so as to extend above the height to which cards are stacked in the container, and below the minimum height of said card stack, the lower sections 78 of these projections assume an inverted semi-conical shape which tapers into a point at 80 where it blends into the adjacent surface of the sidewall 16 or 18. Point 80 is located above although adjacent to the bottom wall 12 of the container so as not to interfere with the insertion of a card at the bottom of the stack through horizontal slot 36. As further cards are marked, removed from the top of the stack and inserted at the bottom, apetred sections 78 of the aligning projections guide the cards as they rise in the stack so that their notches N align and become firmly caught by the semi-cylindrical top section 76 as they reach the top of the stack, become aligned with the template and hold their alignment therewith.

As previously indicated, template 42 is conveniently hinged at 70, 72 so as to pivot about a horizontal axis. If desired, the hinge may be spring-tensioned so that as the reader grasps the edge of the top card through recess 32 to remove it, the template 42 will pivot upwardly and then fall back without requiring any particular action on the part of the reader, to lie flat against the next card. The hinged connection of the template to pivot about a horizontal axis has the further feature that it allows the template to adjust itself to the angle of the top card which may not be exactly parallel with the bottom wall 12 where spacer bosses 38 are employed to lift the front edge of the stack off the container bottom wall 12. The lower edge 68 of the cutout 64 serves as an abutment which limits the downward movement of the template 42 under the weight of slide 62. It will be appreciated also that the location of abutment edge 68 should be at a height such that at the lowermost position of the template 42, it will still lie above the lower extent of the cylindrical portion 76 of the aligning projection 74. Thus it will be understood that in the proper use of the container the stack of cards will be sufficiently high that hinge plate 72 is spaced off abutment edge 68 when the template is lying flat on the top card, and furthermore that the top card will have the notches engaging about the upper cylindrical portion 76 of the aligning means 74. If the number of meters on a particular route do not require a stack of cards sufficiently high, the stack can of course be built up by blank or dummy cards at the bottom of the stack.

Referring now to the FIGURES 7, 8 and 9, an alternative arrangement is shown wherein template 42 is replaced by a template 42' which is of transparent material and covers essentially all of the top card in the stack, except for a clearance recess at 102 which accommodates convenient grasping of the top card or stack of cards. A second area is also shown at 104 which allows the reader to make notes on the customer's card through the template before removing the card from the top of the stack and inserting it at the bottom of the stack through the provided slot 36 or beneath clip 28 on the cover 22.

In this second illustrated embodiment, the construction of the container 10 is generally the same as in the first described embodiment. However, it is formed essentially greater in both width and length than the corresponding dimensions of the cards C and for which reason the outwardly flared sections 36 provided at the ends of the horizontal slot 36 in the first embodiment are omitted. Also, the larger size of container requires a variation in the aligning means to assure proper alignment of the top card in the stack with the template. Therefore, referring to FIGURE 8, it will be seen that aligning means 74 have been replaced by two spaced projections 74' on each of sidewalls 16 and 18 but which are otherwise shaped similar to projections. A pair of aligning projections 74" of similar shape are also located on the forward wall 20, one centered on tab 22a and one centered on tab 22b. In this embodiment cards C are not notched but have smooth uninterrupted opposed pairs of parallel edges. Consequently as illustrated in FIGURE 10, the upper cylindrical sections 70' of aligning projections 74' on the sidewalls 16 and 18 engage the corresponding side edges of the top cards C in the stack so that the top card is centered between said two walls, while aligning projections 74" on tabs 22a and 22b engage the front edge of the same top cards in the stack urging them toward the planar surface of offset portion 58 of the keyway forming sheet element 54, so that the coded marking areas of the top card in the stack are properly aligned with the stencil openings 44 in template 42'. As in the first described embodiment projections 74' and 74" also have tapered or inverted conical-shaped lower sections 78' and 78", respectively, which terminate short of the bottom wall of the container (adjacent the lower edge of tabs 22a and 22b in the case of projections 74") to allow freedom to insert a card beneath the stack and thereafter force the cards into the desired alignment as additional cards are added to the bottom of the stack and they rise in the stack to the top.

As mentioned above, template 42 and 42' may be either opaque or transparent. When formed of transparent material it permits the reader to see the entire card and to read any message thereon. However such transparent materials are usually also highly reflective of light. Therefore where the template is formed of, for example, a transparent plastic material such as methyl methacrylate the area about the stencil openings 44 is usually frosted or otherwise dulled to lessen light reflection from the reader's flashlight when used in dark cellars or other areas and so that the reader can more easily differentiate the openings 44 and avoid errors. Such a dulled area is indicated at 106 on template 42' shown in FIGURE 8.

As thus described, it will be apparent that all of the objects, advantages and features recited for the invention have been demonstrated as obtainable in a convenient, simple, economical and highly practical matter. Thr having described my invention I claim:

1. A container for meter reading cards having a bottom wall and four sidewalls which together define a rectangular-shaped area corresponding approximately to the dimensions of said cards and are of a height to receive a stack of such cards, the cards each having coded marking areas thereon, one of said walls including a vertically extending guideway, and a template connected to a weighted slide slidingly keyed in said guideway, said template resting flat on the top cards of said stack under the weight of the slide and having stencil openings therethrough corresponding to the locations of the coded marking areas of said cards, the opposite wall of said container having a horizontal slot adjacent the bottom wall through which a card may be inserted at the bottom of the stack, said container walls having guide projections which converge inwardly from above the bottom wall and include parallel upper portions which engage side edges of the cards in the stack and so as to locate the top card of the stack in a predetermined location and registry with the template.

2. A container for meter reading cards as claimed in claim 1 wherein the guideway is provided with abutment means engageable by the slide, and the upper limit of the converging portion of the guide projections terminates below the horizontal plane in which the template is supportable when its slide is in engagement with said abutment means.

3. A container adapted to receive a stack of meter reading cards comprising a bottom wall, a pair of sidewalls, a rear wall and a front wall integral with said bottom wall, said forward wall comprising a pair of tabs having their inner ends spaced from each other and their lower edges spaced from the container bottom wall to provide a horizontal slot across the width of said forward wall which facilitates insertion of a card at the bottom of a stack of cards in said container, the bottom wall of said container being provided with spacer means adjacent but spaced from its forward end which hold the bottom of the stack off the bottom wall at said forward end of the container, a template to overlie the top card of the stack, hingedly connected to a weighted slide member, a sheet-like element secured to said rear wall and having a central planar portion in offset spaced parallel relation to said rear wall to define a slot therebetween and said rear wall for slidably receiving said weighted slide member, said offset central section of said element further having a rectangular shaped cutout in its upper edge through which the hinge element connecting the slide to the template extends, said container having a pair of spaced vertically extending guide projections on the inner side of each its said sidewalls, and a similar vertically extending guide projection on each said tabs comprising the forward wall of the container, said guide projections including top sections which engage the sides of the cards on the top of the stack to center them between the container sidewalls and against said offset portion of the sheet-like element so as to align at least the top card of the stack in a predetermined position with respect to the template, said guide projections having outwardly sloping lower sections merging with the sidewalls above the bottom wall to provide clearance for a card when inserted through the horizontal slot at the bottom of the stack and to guide it into alignment with the template as it rises in the stack, said template having stencil openings which are thus accurately registered with coded areas of the top one of said stack of cards to be marked, and a cover hingedly connected along the top edge of one wall of said container, said cover having a spring clip adjacent one end on its inner side which releasably hold cards in the container separate from the stack of cards beneath the template.

4. A container adapted to receive a stack of meter reading cards comprising a bottom wall, a pair of sidewalls, a rear wall and a front wall integral with said bottom wall, said forward wall having a horizontal slot adjacent the edge of the bottom wall and which extends across the full width of said forward wall to permit insertion of a card at the bottom of a stack of cards in said container, the bottom wall of said container being provided with spacer means adjacent said cross bar portion of the slot which hold the bottom of the stack off the bottom wall at said forward end of the container, said sidewalls having outwardly deflected portions at either end of said horizontal slot which facilitate insertion of a card through said slot, the two sidewalls of the container each further having an inwardly directed, vertically extending guide projection the top portions of which fit within provided notches in the sides of the cards to locate at least the top card of the stack in a predetermined position within the container, said guide projections having outwardly sloping lower sections merging with the sidewalls above the bottom wall to provide clearance for a card inserted through the horizontal slot at the bottom of the stack, a marking template to overlie the top card of the stack and which is hingedly connected to a weighted slide member, a sheet-like element secured along its two side margins to said rear wall and having its central portion in offset spaced parallel relation to said rear wall to define a slot therebetween and said rear wall for slidably receiving said slide member, said offset central section of said element further having a rectangular shaped cutout in its upper edge, said cutout having parallel vertical edges spaced apart a distance less than the width of said offset central portion and a lower horizontal edge spaced above the bottom wall of the container, said weighted slide member including a first portion which slidingly fits in the slot comprising the space between said offset central portion and the container rear wall and a second narrower portion which slidingly fit in the cutout in the upper edge of said sheet-like element, the lower edge of said cutout serving as an abutment for limiting the downward movement of said slide member, said cutout and slot cooperating with the slide member to accurately locate the hinged template over the top card of said stack as located by said guide projections, said template having stencil openings which are thus accurately registered with coded areas of the top one of said stack of cards to be marked.

5. A container adapted to receive a stack of meter reading cards comprising a bottom wall, a pair of sidewalls, a rear wall and a front wall integral with said bottom wall, said forward wall having an inverted T-shaped slot the vertical of which interrupts the top edge of said wall and the lateral of which T-shaped slot is disposed adjacent the edge of the bottom wall and extends across the full width of said forward wall to permit insertion of a card at the bottom of a stack of cards in said container, the bottom wall of said container being provided with upwardly struck boss-like means adjacent said cross bar portion of the slot which space the bottom of the stack off the bottom wall at said forward end of the container, said sidewalls having outwardly deflected portions at either end of the lateral of said T-shaped slot to make convenient the insertion of a card through said slot, said container sidewalls further having inwardly directed, vertically extending guide projections the top portions of which locate the top card of the stack in a predetermined position within the container, said guide projections having outwardly sloping lower sections which merge with the sidewalls above the bottom wall of the container to provide clearance for a card when inserted through the horizontal slot at the bottom of the stack, a marking template to overlie the top card of the stack, which is hingedly connected to a weighted slide member, a sheet-like member secured along its two side margins to said rear wall and having its central portion in offset spaced parallel relation to said rear wall defining a slot therebetween and said rear wall, said offset central section of said element further having a rectangular shaped cutout in its upper edge, said cutout having parallel side edges spaced apart less than the width of said offset central portion and a lower edge spaced above the bottom wall of the container, said weighted slide member including a first portion which slidingly fits in the slot comprised by the space between said offset central portion and the container rear wall, said weighted slide member including a second narrower portion which slidingly fit in the cutout in the upper edge of said element, the lower edge of said cutout serving as an abutment for limiting the downward movement of said slide member, said cutout and slot cooperating with the two portions of the slide member to accurately locate the hinged template over the top card of said stack as located by said guide projections, said template having stencil openings which are thus accurately registered with coded areas of the top one of said stack of cards to be marked, and a cover hingedly connected along the top edge of one wall of said container, said cover having a spring clip adjacent one end of its inner side which releasably hold cards in the container separate from the stack of cards beneath the template.

6. The container claimed in claim 5 wherein the template is transparent.

7. The container claimed in claim 5 wherein the template covers essentially the full area of the cards.

8. The container claimed in claim 5 wherein the stencil openings have beveled edges.

9. The container claimed in claim 5 wherein the stencil openings comprise horizontal rows of oblong shaped slots in vertical columns, the columns being separated by colored lines.

10. A container for meter reading cards having a bottom wall and four side walls which together define a rectangular-shaped area slightly in excess of the dimensions of said cards and of a height to receive a stack of such cards, the cards each having coded marking areas thereon, one of said walls including a vertically extending guideway, and a template connected to a slide slidingly keyed in said guideway against lateral movement, said template resting flat on the top card of said stack and having stencil openings therethrough corresponding to the locations of the coded marking areas of said cards, the other three side walls of the container each having a pair of spaced guide projections extending vertically thereof from adjacent the bottom wall of the container which engage said stack of cards and locate the top card thereof in a predetermined location and registry with the template, the said guide projections each having an upper portion of semi-cylindrical shape and a lower portion of inverted conical shape, the tip of which merges into the wall adjacent to but above the container bottom wall.

References Cited by the Examiner

UNITED STATES PATENTS

| | | | |
|---|---|---|---|
| 290,616 | 12/1883 | Wine | 129—26 |
| 702,518 | 6/1902 | Willon | 129—26 |
| 1,291,474 | 1/1919 | Geimer | 129—26 |
| 1,871,597 | 8/1932 | English | 33—189 X |
| 2,215,833 | 9/1940 | Large | 281—44 |
| 2,532,053 | 11/1950 | Bickel | 281—44 |
| 2,690,017 | 9/1954 | Neil | 33—174 |
| 2,707,115 | 4/1955 | Rolleston | 281—44 |
| 2,770,473 | 11/1956 | Sedlacek | 281—44 |

ISAAC LISANN, *Primary Examiner.*

L. FORMAN, *Assistant Examiner.*